Figures 1, 2:
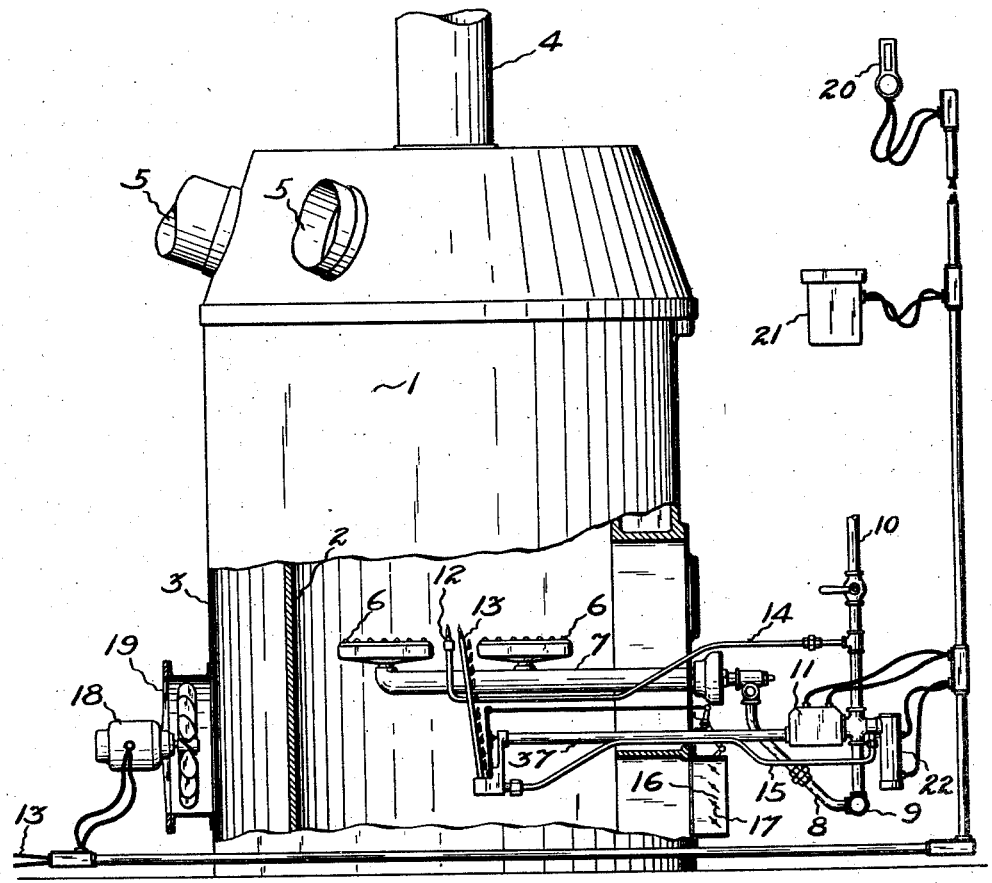

Jan. 19, 1932.  E. J. TE PAS  1,842,336
GAS APPLIANCE CONTROL
Filed April 15, 1929  2 Sheets-Sheet 1

INVENTOR
Edmund J. Te Pas
BY
Edmund J. Te Pas
ATTORNEY

Jan. 19, 1932.　　　　E. J. TE PAS　　　　1,842,336
GAS APPLIANCE CONTROL
Filed April 15, 1929　　　2 Sheets-Sheet 2

INVENTOR
Edmund J. Te Pas
BY
Edmund J. Te Pas
ATTORNEY

Patented Jan. 19, 1932

1,842,336

UNITED STATES PATENT OFFICE

EDMUND J. TE PAS, OF LAKEWOOD. OHIO, ASSIGNOR TO THE PATROL VALVE COMPANY, OF CLEVELAND, OHIO, A CORPORATION OF OHIO

GAS APPLIANCE CONTROL

Application filed April 15, 1929. Serial No. 355,233.

This invention relates to automatically controlled heating devices and in particular thermostatically controlled gas fired warm air furnaces.

One of the principal objections to the present day automatically controlled heating appliances is their relatively high cost, a large portion of which is due to the control devices that are used in connection with the appliance and which as a rule are responsible for the greater portion of the cost of the complete device.

Another objection to the average automatically controlled furnace or boiler is the large number of independent control elements which are used and which are often complicated devices that are liable to become inoperative and require frequent servicing.

A further shortcoming of a great many control devices is that they do not incorporate any arrangement or mechanism to render the appliance safe under all conditions of operation.

One of the objects of this invention is to provide a heating appliance which is automatically and safely controlled under substantially all conditions.

Another object of this invention is to provide a control system for a gas burning appliance which becomes inoperative upon the extinguishment of the constantly burning pilot of the appliance.

Another object of this invention is to provide an electrically operated thermostatic control for a gas fired heating appliance that cuts off the fuel supply of the appliance upon failure of either the gas supply or the source of electrical current.

Another object of this invention is to provide a combined thermostatic gas valve and electric switch for a gas fired hot air furnace, that controls the gas supply to the furnace and the operation of a circulating fan for the air that is being heated.

Another object of this invention is to provide a gas fired heating appliance in which the secondary air supplied to the main gas burners is automatically controlled in accordance with the flow of gas thereto.

A further object of my invention is to provide a generally simplified gas fired boiler or furnace control that may be inexpensively manufactured and readily installed on the appliance, and that combines in a single device a safety fuel control and auxiliary controls for the air necessary to support combustion and for the mechanical circulation of the medium that is being heated, the temperature of which is responsible for the operation of the device.

Stated in general terms, my invention comprises a gas fired hot air furnace having a forced air circulator, and an automatic secondary air control operatively associated with a thermostatic gas valve that is under control of the pilot burner of the appliance; the thermostatic valve being provided with an electrical switch by which it starts and stops the motor of the air circulator. The thermostatic valve is in turn controlled by a thermostatic switch that is operated in accordance with the temperature of the medium which the furnace is heating.

An important advantage of my improved control is due to the fact that the device requires at all times the presence of a pilot light for its proper functioning. It is inherently safe as the presence of the pilot burner flame is necessary in order to be able to supply gas to the main burner. This same flame also serves to ignite the gas supplied to the main burner. In the event of failure of either the electrical current supply or the gas supply, or upon the extinguishment of the pilot flame the appliance is automatically rendered inoperative with its gas supply valve in closed position. The efficiency of the appliance is greatly increased by reason of the forced air circulator and the control means that is provided for the secondary air supply of the main heating burner.

Another advantage of my improved control is its extreme simplicity and compactness. The control valve combines in a single unitary structure a main control gas valve and electric switch and a thermostatic electrical gas valve.

A further advantage resulting from the unitary construction of my control is the ease with which it may be installed on an appliance. All of these features tend to reduce the cost of the control and the complete appliance of which it forms a part.

These and other objects and advantages will be disclosed in detail in the following description of my device and the scope of my invention will be particularly pointed out in the appended claims.

Figure 3:
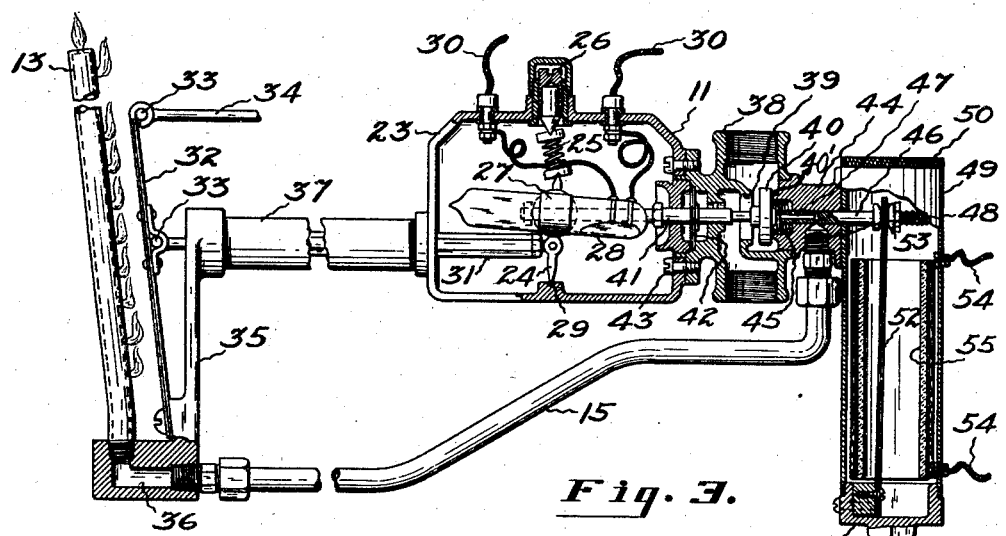
Figures 4, 5:
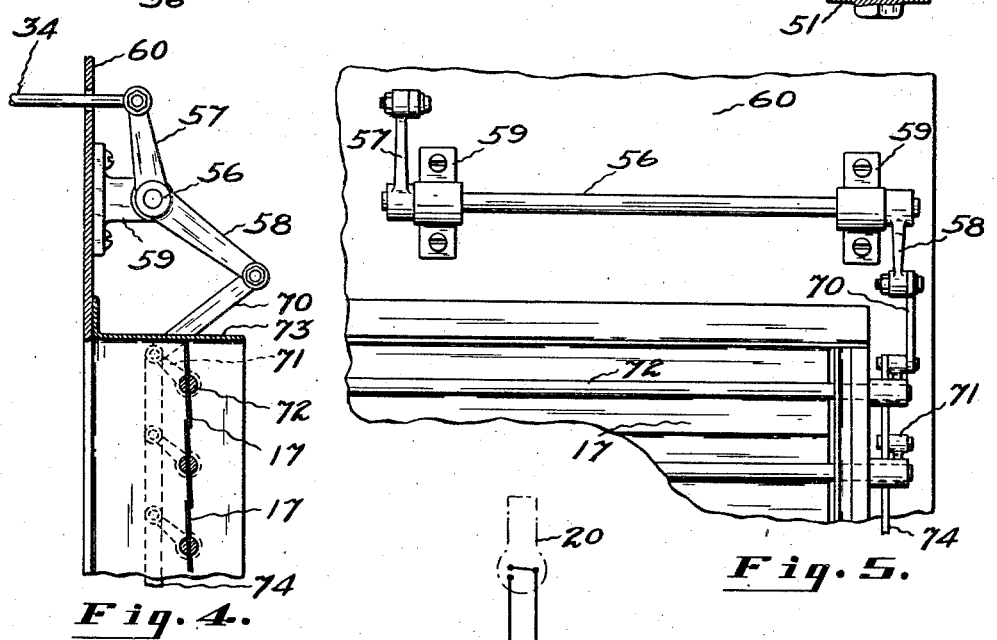
Figure 6:
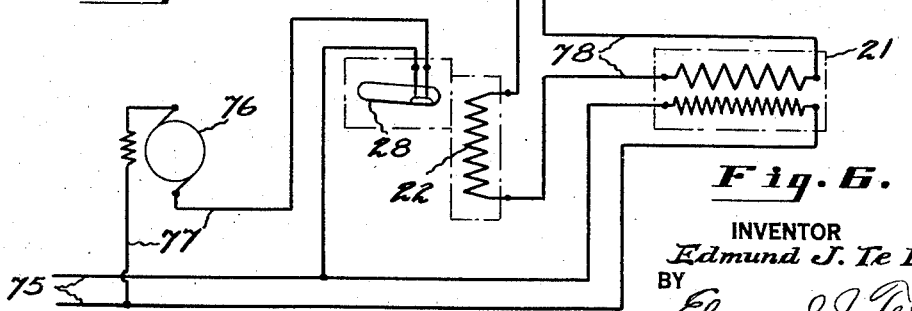

In the drawings illustrating one embodiment of my invention, Figure 1 represents a side elevational view partly in section of a hot air furnace that is controlled by my improved device. Figure 2 is a plan elevational view of the burner and control valve assembly. Figure 3 is a sectional view of the control valve and switch. Figure 4 is an end elevational view partly in section of the secondary air control. Figure 5 is a side elevational view showing the secondary air control. Figure 6 is an electric wiring diagram of the circuits used to connect up the various electrical devices used in the control.

The furnace used to illustrate one mode of practicing my invention is indicated by the numeral 1. This furnace is a gas fired hot air furnace having an inner combustion chamber the wall 2 of which is indicated in Figure 1. The combustion chamber is inclosed by an outer casing 3. The space between the combustion chamber and the outer casing is provided for the circulation and heating of air which is forced through and delivered from the appliance to the circulating conduits 5, and from there it is conducted to the space or rooms that the furnace is intended to heat.

Gas burners 6 are located in a combustion chamber. These burners are in communication with a gas and air mixing tube 7 that is provided at its outer end with the usual openings thru which air is entrained by the flow of the gas. Gas is supplied to the mixing tubes by way of conduits 8 that are connected to a manifold 9 which is in turn adapted to be placed in communication with the gas supply conduit 10 by means of the thermostatic valve 11.

A constantly burning pilot burner 12 is maintained in lighting proximity to the main heating burners 6. A vertically arranged auxiliary burner 13 is located in lighting proximity to the pilot burner 12. The burner 13 is adapted, by the heat which it evolves, to open the thermostatic valve 11 when it is burning. The pilot burner 12 is supplied with gas by way of the conduit 14 that is connected to the main gas supply line 10 ahead of the thermostatic control valve 11. Gas to the auxiliary burner 13 is supplied by way of the conduit 15 that is in communication with a by-pass formed in the valve body of the thermostatic valve 11.

The secondary air supply necessary for complete combustion of the gas supplied to the main burner 6 is provided by way of the opening 16. This secondary air inlet is under control of a series of shutters 17 which are opened and closed in accordance with the operation of the burner 6. These shutters are under control of the burner 13 in a manner which will be presently described in detail.

An electric fan 18 is positioned in the opening 19 which serves as an air inlet for the circulating air that is supplied to the heating chamber of the furnace and thereby heated. The thermostatic valve 11 is provided with switching mechanism by means of which the fan 18 is placed in operation when gas is supplied to the main burner of the furnace, thus providing a mechanical circulator for the air that is being heated by the furnace. The operation and control of the fan 18 will be described in detail in connection with the description of the thermostatic valve 11.

The thermostatic valve 11 is under control of a room thermostat 20 which operates in accordance with the temperature of the room in which it is located. The thermostat 20 is connected in series in a 12 to 15 volt circuit and directly controls the operation of a thermostatically actuated electric valve 22. The ordinary lighting supply current of 110 volts is reduced to the lower voltage by means of the transformer 21.

The thermostatic valve and switch 11 is shown in detail in Figure 3. It comprises a box or casing 23 that serves as a housing for the switching mechanism and for a portion of the valve actuating mechanism. Both, the main gas supply valve and the electric switch are actuated by a single snap action mechanism which consists of a pair of unbalanced, oscillating levers, the lower lever 24 of which is rigid and mounted to oscillate in the bearing slot 29 and the upper lever 25 of which is resilient and in engagement with the bearing member provided by the adjustable abutment 26. The levers 24 and 25 are adapted to oscillate in the stated bearings carried by the housing 23 and are in engagement with each other at their unsupported ends. The natural tendency of these levers is to assume either one or the other of their extreme positions upon being shifted past their neutral position or the position in which they are in substantial alignment. The tension of the resilient oscillating lever 25 is adjusted by means of an adjustment member or abutment 26 which comprises a pin rotatably carried in a hollow adjusting screw.

The switching mechanism for the electric fan consists of a mercury tube switch 28 that is carried by means of a clip 27 rigidly secured to the oscillating lever 24 and movable therewith. The tube used in the present case is provided with contact members at one end so that when it assumes the position indicated by Figure 3, or when the snap action mechanism has opened the main gas valve 40, the circuit to the electric fan is closed and the fan is placed into operation. The lead-in members of the mercury switch 28 are connected to the wires 30 by means of a pair of binding posts that are carried by and insulated from the housing 23.

The snap action mechanism is pivotally connected to adjustable link 31 which is at its other end pivotally connected to the bimetallic thermostatic strip 32 at the point 33. The thermostatic element 32 is pivotally connected at 33 to the rod 34. The thermostatic strip in the present case may be any of the suitable commerical thermostatic metals, which may be procured in a variety of gauges and types, and which may be selected in accordance with the operating conditions of the device they are used on.

The strip 32 is rigidly secured at its lower end to a supporting member 35 that is carried by the tube 37 which is in turn secured to the housing 23. The lower end of the supporting member 35 is provided with a cored block providing a gas passage 36 which has threaded openings for reception of the auxiliary burner 13 and its gas supply conduit 15. Secured to one end of the housing member 23 is a valve body 38 the upper threaded opening forming the inlet and the lower threaded opening forming the outlet. A valve seat 39 is integrally formed in the valve body and is under control of the spring resisted valve head 40 that is secured to a valve stem 41. The valve stem 41 is loosely coupled to the rigid lever 24 of the snap action mechanism and is operated by the movement of this lever. A spring 45 is provided to assist in the closing movement of the valve head.

The valve stem 41 is provided with a flexible packing diaphragm 42 that is secured in a gas tight manner at its center to the valve stem 41 and at its outer edge to the valve body by means of a centrally bored threaded plug that also functions as a bearing and guide for the valve stem 41. The valve body 38 is secured to the casing 23 by means of screws 43 and at its opposite end is provided with a coupling member 44 that is adapted to be screwed into an opening formed in the side of the valve body.

The member 44 has a central bored out portion terminating at one end in the valve seat 40' which is adapted to cooperate with the valve head 40 in controlling the gas supply to the burner 13 by way of the conduit 15. The central bore of the member 44 provides a slide for a sleeve valve 46 that has a central passageway 47 which connects one end of the sleeve with an annular groove located about midway between its ends. The annular groove of the sleeve valve 46 is adapted to communicate at times with the conduit 15.

The coupling member 44 provides a support for a tubular casing 49 that forms a sealed container having a removable upper cap 50 and a lower closure cap 51. Housed within the tube 49 is a bimetallic thermostatic strip 52 that is rigidly secured at one end to the lower cap 51. The upper free end of the strip 52 is slotted or forked in order to engage the annularly grooved adjustable head 53 of the sleeve valve 46. By making the strip 52 from a relatively heavy gauge of thermostatic metal and of considerable width, sufficient strength can be incorporated in this element to enable it upon cooling to shift the valve head 40 to its closed position with respect to the seat 39, against the opposition offered by the heated thermostatic element 32. Such an arrangement has been found desirable and made use of in the present instance. Where it is desired to have the valve head 40 practically entirely under control of the burner 13, a thinner and narrower strip can be used for the thermostatic element 52.

An electric resistance heating element is provided within the tube 49 and is connected to a source of current supply by the lead wires 54. This resistance element is wound upon a porcelain shell 55. In the operation of this portion of the control apparatus, when electric current is supplied to the resistor it raises the temperature of the strip 52 causing it to warp to the right as viewed in Figure 3 and assume the position shown in this view. The sleeve valve 46 under these conditions opens up communication between the interior of the valve body 38 and the conduit 15, providing a source of gas supply for the burner 13.

The secondary air supply control comprises the pivotally supported shutters 17 which are mechanically connected to the thermostatic strip 32 by mechanism including the connecting link 34 and the crank arm 57. The crank arm 57 is rigidly connected to a shaft 56 which is at its opposite end provided with a second crank arm 58. The shaft 56 is supported by bearing members 59 that may be secured to the front plate 60 of the furnace. The lower lever arm 58 is connected to a toggle link 70 which in turn connects with the shutter cranks 71. These cranks are connected to each other by means of a connecting rod 74.

The individual shutter vanes are carried by support rods 72 that are journaled in bearings carried by the shutter frame 73. It will thus be seen that the movement of the thermostatic strip 32 is transmitted to the shutter 17 by the above stated links and levers so that when the thermostatic strip 32 is moved to the right as viewed in Figures 1 and 3, the shutters 17 will be in open position and when the strip 32 is shifted to the left the shutters are moved to their closed position. When these operations take place the gas supply to the burner 6 is automatically opened and closed.

The movement of the thermostatic strip 32 is transmitted to the snap action levers 24 and 26 by the link 31. In the closed valve position, the levers 24 and 25 are inclined to the left with their point of engagement lying to the left of their aligned position. When these levers are shifted to the right by the strip 32 and the link 31 they gradually come into alignment and upon passing this point, the tension of the resilient member 25 serves to snap them to the position shown in Figure 3.

During the latter half of this movement the lever 24 is in engagement with the valve stem 41 and shifts the valve head 40 to uncover the seat 39 and into engagement with the seat 45. This movement of the valve head admits a supply of gas to the burners 6 and temporarily cuts off the supply of gas to the auxiliary burner 13. At the time of opening of the main gas valve the mercury switch 38 is tipped to the right closing the electrical circuit to the fan 18.

Within a short time after the admission of gas to the burners 6 and the extinguishment of the burner 13, the strip 32 will have cooled sufficiently to shift a small amount to the left whereupon the spring 45 behind the valve head 40 urges it to follow the movement of strip 32 uncovering the valve seat 40' and again supplying gas to the burner 13. In this manner the heat applied to the thermostatic strip 32 is controlled and regulated preventing overheating and greatly increasing the life of the thermostatic metal.

Referring to the wiring diagram Figure 6, the electrical circuit for the control is as follows: The 110 volt supply line is indicated at 75, current from this source is adapted to be placed in circuit with the fan motor 76 by way of the lead wire 77 which is under control of the switch 28. The 110 volt circuit to the motor is opened and closed by the switch 28 in accordance with the position of the snap action mechanism of the main gas supply valve. The main gas supply valve 11 is under control of the room thermostatic switch or room thermostat 20 which is in the low voltage circuit that has been reduced from 110 volts by means of the transformer 21. The low voltage circuit indicated by the numeral 78, includes the resistance wire of the thermostatic electric valve 22 which is directly controlled by the thermostatic switch of the room thermostat 20. Another method of accomplishing the same result would be to dispense with the transformer 21 using a thermostat 20 that is capable of handling the full line voltage. The resistor 22 would then be made of a suitable material to take care of the higher voltage. The operation of the device is exactly the same regardless of whether the thermostat is handling a high or a low voltage current.

In the operation of the device, assuming that the room thermostat is set to maintain a temperature of 70°, when the temperature falls below this value the low voltage circuit is closed and an electric current flows through the resistance coil of the valve 22. In a short time there is sufficient heat generated at this point to shift the free end of the thermostatic strip 52 to the right assuming the position shown in Figure 3. In this position, it being assumed that the valve head 40 is in engagement with the seat 39 and that the main gas supply to the burner 6 is cut off; gas can pass by way of the inlet passage of the valve body 39 to the central bore 47 of the sleeve valve, then to the outlet 48 and to the burner 13, by way of the conduit 15. In this manner a supply of gas is provided for the burner 13 and is ignited by the constantly burning pilot 12.

In the event that the pilot 12 is extinguished or not in operation, it will be impossible to ignite the burner 13 and the whole device will be inoperative and in its closed valve position. In order to start the device under such conditions, namely upon extinguishment of the pilot burner or in the absence of a flame thereat, it will be necessary to light the pilot 12 before the device can be placed into operation.

Assuming however, in the present case that the pilot burner is in operation, gas supplied to the burner 13 will be ignited thereby and will provide a series of vertically arranged flames adjacent the thermostatic strip 32. These flames heat the strip 32 causing it to shift or warp to the right as viewed in Figures 1 and 3, carrying with it the snap action mechanism defined by the levers 24 and 25. Upon passing their dead center position the levers 24 and 25 will be snapped to their extreme right hand position. The lever 24 is provided with a lost motion connection with the valve stem 41 so that the initial portion of its movement will not affect the valve stem 41. But immediately upon passing dead center position the lever 25 contacts with the valve stem 41 and quickly snaps it and its associated valve head 40 to a fully opened position.

At the same time the above action takes place the mercury switch 28 is snapped to a closed circuit position. In this manner and in accordance with the operation of the room thermostat 20, the gas supply to the main burner 6 is turned on and at the same time the air circulating fan 18 is placed in operation. While the above operations are taking place, the thermostatic strip 32 shifts the vanes 17 to the open position concurrently with the opening of the gas valve and the starting of the electric fan. Thus, by its shifting, the strip 32 starts the motor 76 of the fan, turns on the gas supply to the burner 6 and opens the secondary air supply control of these burners. The device continues to function in this manner until the temperature of the thermostat 20 is raised to the predetermined temperature for which it was set, in this case 70°.

Upon reaching this temperature the thermostat opens the electric circuit to the resistor of the electric thermostatic valve 22 allowing the element 52 to cool. Upon cooling, the thermostatic strip 52 shifts to the left as viewed in Figure 3, cutting off the gas supply to the burner 13 by reason of the annular slot moving out of registry with the opening 48 and at the same time that this action is taking place the strip 52 is forcing the sleeve valve 46 against the valve head 40 tending to urge it to its closed position.

Within a short time after the extinguishment of the burner 13 the thermostatic strip 32 has had an opportunity to cool and in so doing its free end moves to the left as viewed in Figure 3, carrying with it the connecting rods or links 31 and 34. Shifting of the rods 31 and 34 to the left causes a secondary air supply shutter 17 to close and at the same time shifts the snap action mechanism comprising the links 24 and 25 to the valve closing position whereby the valve head 40 is shifted with a snap action motion to its closed position and at the same time the mercury switch 28 is shifted to the open circuit position. In this manner the circuit to the electric fan is opened, putting this device out of operation at the same time the main gas supply to the burner 6 is shut off.

In this position of the controlling device, the main gas supply to the burners 6 is cut off, the secondary air supply opening is closed and the mechanical air circulator is stopped. Under these conditions there is a thermo-siphon circulation of air thru the furnace to the rooms that are being heated. It is to be noted that under these conditions when secondary air supply inlet 16 is closed a large loss of heat which would ordinarily pass up the chimney is prevented and by virtue of the secondary air control the furnace wall and combustion chamber remain heated for a greater length of time, giving up their heat only to the circulating air.

It is apparent that this device could be used in connection with other gas burning appliances either in part or wholly and its use is not necessarily restricted to furnaces of the type illustrated.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. A hydro-carbon burner, an ignition pilot burner therefor, thermostatic means dependent upon the presence of a flame at said ignition pilot to control the operation of said burner, and mechanism operatively associated with said thermostatic means to control the secondary air supply of said burner.

2. A control means for a hydro-carbon burner adapted to control both the fuel supply and the air supply necessary to support combustion comprising, a flame controlled thermostatic actuator, and gas and air control means operatively associated therewith.

3. An automatic control for furnaces and the like comprising, gas burners for the appliance, a room thermostat, a gas valve, an electric fan, an electric switch for controlling the operation of said fan, a thermostatic actuator for said valve and switch, a source of heat for said actuator, and an electro thermostatic gas valve controlled by said room thermostat for controlling the operation of said source of heat whereby upon the opening of the electro thermostatic gas valve the thermostatic gas valve and switch are shifted providing a supply of gas to said burners and connecting said fan to a source of electrical current supply.

4. An electro thermostatic valve comprising, a resistor element adapted to be placed in circuit with an electric current, a thermostatic element adjacent said resistor, a sleeve valve under control of said thermostatic element, and a second gas valve adapted to be engaged by said sleeve valve.

5. In a gas burning appliance, a main gas burner, a source of fuel supply therefor, an ignition pilot burner for said main gas burner, a thermostatic valve to control the supply of fuel to said main gas burner, an auxiliary burner adapted to be ignited by said pilot burner and to provide the sole source of heat for the operation of said thermostatic valve, and means operatively associated with said thermostatic valve to control the secondary air supply to said main gas burner.

6. In a gas burning appliance, a main gas burner, a source of fuel supply therefor, an ignition pilot burner for said main gas burner, a thermostatic valve to control the supply of fuel to said main gas burner, an auxiliary burner adapted to be ignited by said pilot burner and to provide the sole source of heat for the operation of said thermostatic valve, and an air valve operatively associated with said thermostatic valve to control the secondary air supply to said main gas burner.

7. In a gas burning appliance, a main gas burner, a source of fuel supply therefor, an ignition pilot burner for said main gas burner, a thermostatic valve to control the supply of fuel to said main gas burner, an auxiliary burner adapted to be ignited by said pilot burner and to provide the sole source of heat for the operation of said thermostatic valve, and a series of cooperating shutters operatively associated with said thermostatic valve to control the secondary air supply to said main gas burner.

8. A gas fired hot air furnace having a combustion chamber and a heat exchange chamber for circulating air, a gas burner in said combustion chamber, an electric fan to provide forced air circulation through said heat exchange chamber, air shutters controlling the secondary air supply of said main burner, valve means to control the fuel supply of said main burner, an electric switch to control the operation of said fan, thermostatic means to actuate said air shutters, valve means and switch, a source of heat for said thermostatic means, an electro-thermostatic valve to control the operation of said a source of heat for said thermostatic means, and a thermostatic switch to control the operation of said electro-thermostatic valve.

9. In a thermostatic gas valve, the combination of a flame actuated thermostat adapted to shift the valve to its open position, and an electrically heated thermostat adapted to shift the valve to its closed position.

10. A gas burning heating appliance adapted to heat a circulating medium, a main heating burner, an ignition pilot burner therefor, and thermostatic means dependent upon the presence of a flame at said pilot burner for controlling the circulation of said medium and the fuel supply of said main heating burner.

11. A gas burning heating appliance adapted to heat a circulating medium, a main heating burner, an ignition pilot burner therefor, and thermostatic means dependent upon the presence of a flame at said pilot burner for controlling the circulation of said medium and the fuel and air supply of said main heating burner.

12. A gas burning heating appliance adapted to heat a circulating medium, a main heating burner, an ignition pilot burner therefor, thermostatic means dependent upon the presence of a flame at said pilot burner for controlling the circulation of said medium and the fuel supply of said main heating burner, and means responsive to the temperature of said medium to control the operation of said thermostatic means.

13. The combination with a heating device having a fan and a fuel line and a pair of thermostats, of a valve in said fuel line, a bimetallic thermostat to control the operation of said valve, a resistance member adjacent thereto, and an actuating electric circuit therefor adapted to be actuated by the other of said thermostats, an actuating electric circuit for said fan, and means for closing said fan circuit in response to the operation of said valve.

14. The combination with a heating device having a fan and a fuel line and a pair of thermostats, of a valve in said fuel line, a bimetallic thermostat to control the operation of said valve, a resistance member adjacent thereto, and an actuating electric circuit therefor adapted to be actuated by the other of said thermostats, an actuating electric circuit for said fan, and means for closing said fan circuit in response to the operation of said valve, including a lever adapted to be oscillated by the movement of said valve in response to the actuation of the bimetallic thermostat, and a circuit closing member mounted on said lever.

15. The combination with an air heating device having an air circulating fan and a fuel supply conduit and a plurality of thermostats, of a valve in said fuel supply conduit, a thermostatic member adapted to actuate said valve, a bimetallic thermostat to control the operation thereof, a resistance member associated therewith, an actuating circuit for said resistance member adapted to be closed by another thermostat, an actuating circuit for said fan, and means for closing said fan circuit in response to the actuation of said thermostatic member.

16. The combination with an air heating device having an air circulating fan and a fuel supply conduit and a plurality of thermostats, of a valve in said fuel supply conduit, a thermostatic member adapted to actuate said valve, a bimetallic thermostat to control the operation thereof, a resistance member associated therewith, an actuating circuit for said resistance member adapted to be closed by another thermostat, an actuating circuit for said fan, and means for closing said fan circuit in response to the actuation of said thermostatic member, including a lever and a circuit closing member positioned thereon and adapted to be actuated by the change in the inclination of said lever.

17. The combination with an air heating device having an air circulating fan and a fuel supply conduit and a plurality of thermostats, of a valve in said fuel supply conduit, a thermostatic member adapted to actuate said valve, a bimetallic thermostat to control the operation thereof, a resistance member associated therewith, an actuating circuit for said resistance member adapted to be closed by another thermostat, an actuating circuit for said fan, and means for closing said fan circuit in response to the actuation of said thermostatic member, including a circuit making and breaking mercury tube adapted to be tilted in response to the actuation of said valve.

18. The combination with an air heating device having an air circulating fan and a fuel supply line and a room thermostat, of a valve in said fuel supply line, a thermostatic member adapted to control the operation of said valve, a resistance member associated therewith, an actuating electric circuit for said resistance member adapted to be closed by said room thermostat, an actuating electric circuit for said fan, and means for closing said fan circuit in response to the operation of said valve, and means for supplying current to the actuating circuit for said resistance member which includes a transformer, the primary coil of which is in the fan circuit and the secondary coil of which is in said resistance member actuating circuit.

19. In a heating apparatus, the combination with a radiating unit, a main burner operatively associated with said radiating unit, a pilot for said main burner, a main gas supply valve, a blower operatively associated with said radiating unit and provided with a motor, a cut-out switch for said motor, and a thermal device operatively associated with said pilot acting when unheated to hold said switch in open position and when heated to close said switch.

In testimony whereof I affix my signature.

EDMUND J. TE PAS.